US006178684B1

(12) United States Patent
Nyakas et al.

(10) Patent No.: US 6,178,684 B1
(45) Date of Patent: Jan. 30, 2001

(54) COLLAPSIBLE FISHING NET MECHANISM

(76) Inventors: Andras Nyakas; Jenö Fehér, both of Beavermeadow Road, R.R. #1, Site 4, Box 7, Port Sydney, Ontario (CA), P0B 1L0

( * ) Notice: Under 35 U.S.C. 154(b), the term of this patent shall be extended for 0 days.

(21) Appl. No.: 09/326,567

(22) Filed: Jun. 7, 1999

(51) Int. Cl.[7] .................................................. A01K 77/00
(52) U.S. Cl. .................................................................. 43/12
(58) Field of Search ............................................ 43/11, 12

(56) References Cited

U.S. PATENT DOCUMENTS

| | | |
|---|---|---|
| 403,680 | 5/1889 | Landman . |
| 412,773 * | 10/1889 | Meisselbach ............................ 43/12 |
| 440,568 | 11/1890 | Hebard . |
| 649,581 * | 5/1900 | Landman ................................. 43/12 |
| 1,077,481 | 11/1913 | Levy . |
| 1,169,311 | 1/1916 | Walter . |
| 2,205,229 | 6/1940 | Spriggs et al. . |
| 2,619,755 | 12/1952 | Henson . |
| 3,032,908 * | 5/1962 | Cohen ..................................... 43/12 |
| 3,167,878 | 2/1965 | Daffron . |
| 3,803,742 | 4/1974 | Foster . |
| 4,446,646 | 5/1984 | van't Veld . |
| 5,497,580 | 3/1996 | Vanderplaats . |
| 5,581,929 | 12/1996 | Molloy . |

FOREIGN PATENT DOCUMENTS

| | | | |
|---|---|---|---|
| 126841 * | 2/1948 | (AU) | ........................................ 43/12 |
| 924097 * | 4/1963 | (GB) | ........................................ 43/12 |

* cited by examiner

*Primary Examiner*—Jack W. Lavinder
(74) *Attorney, Agent, or Firm*—Eugene J. A. Gierczak

(57) ABSTRACT

A collapsible fishing net device comprising a handle having a first end and second end, and fastening block disposed within said handle and adjacent to said first end; collapsible net frame comprising a hinge means comprising a first hinge arm, and second hinge arm first net frame arm and second net frame arm associated with said first and second hinge arms respectively wherein each of said first and second net frame arms presents a first end which is proximal to said hinge means and second end which is distal to said hinge means; coupler adjacent to said distal end of said first and second net frame arms, said coupler being engageable to couple said first and second net frame arms, fastener operably associated with said hinge means and fastening block to fasten said collapsible net frame to said handle assembly; and net associated with said collapsible net frame wherein said fastening block receives said fastener and said first and second net frame arms are coupled by said coupling means to present a substantially circular net frame in a first operable position, and said coupler is disengaged and said first and second net frame arms are disposed substantially parallel in a second collapsed position.

16 Claims, 5 Drawing Sheets

COLLAPSIBLE FISHING NET MECHANISM

FIELD OF INVENTION

This invention relates generally to hand-held fishing nets and, more particularly, to a hand-held fishing net that can be collapsed or folded into a compact form for easy transportation and storage and to prevent damage to the net during transportation.

BACKGROUND ART

Various such collapsible hand-held fishing nets are known.

U.S. Pat. No. 403,680 issued on May 21, 1889 to J. G. Landman entitled "Hinge-Screw Coupling for Fishing-Net Frame", relates to a hinge-screw coupling consisting of two parts hinged together and provided each with a projection, both of which projections when closed together have exterior continuous screw-threads to receive a screw ferrule or handle, and the two parts of the coupling independently of the hinge are provided, respectively, with a tongue or projection and a groove or recess which interlock to strengthen the hinge-coupling against lateral strain. The invention contemplates the net being wound around the side bars provided, thereby permitting the net to be stored in a small place.

U.S. Pat. No. 440,568 issued on Nov. 11, 1890 to C. S. Hebard, provides a hollow handle having a longitudinal slot of approximately even length with the handle and having at each end an offset or L-shaped extension, in which said slot slides a button sustained in a round plug of slightly less diameter than the inner diameter of said handle, in order that the said plug may slide to and fro in the handle under the impulse of the button and be locked against movement in either direction by the engagement of the latter with one of said offsets. Pivoted in said plug is a pair of arms of such length that when the plug is withdrawn to the bottom or closed end of the handle such arms will rest wholly within said handle, and when the plug is projected to the open end of the handle with the arms in advance said arms are free to be distended into a V shape, in which position they are maintained by a knuckle-jointed rod, which is hinged at each of its ends to the outer ends of said arms, and by the spring of the arms is maintained at an angle whose apex is higher than such ends, thus forming a rigid frame for the net, which latter is secured to rings which slide freely on the rod and arms, according as the same are manipulated. When the net frame described herein is folded in a manner the reverse of the above-described opening operation, bringing the arms and rod-sections side by side, the net is wound snugly around the same, and when the plug is withdrawn will be drawn wholly within said handle and locked against accidental projection by the engagement of the button with the offset at the lower end of the slot.

U.S. Pat. No. 1,077,481 issued to Harry Levy on November 4, 1913 relates to a collapsible net device comprising a net frame which is attached to a handle. Said net frame comprises two members hingedly connected at their inner and outer ends to a flattened hinge portion of a screw. Each of such hinged members comprises a plurality of resilient sections slidably connected to vary the length of the members. Said hinged members further comprise a straight portion. Said handle presents a washer which bears against the straight portion of said hinged members and the bottom surface of said flattened hinge position, as best shown in FIG. 11.

U.S. Pat. No. 1,169,311, issued on Jan. 25, 1916 to G. C. Walter, relates to a fish net holder comprising a handle, a member detachably connected with one extremity of the latter, two spring sections having their inner extremities connected with said member, a third spring section detachably connected with the first named sections, and a net supported by said sections. The net is wound around said two spring sections and stored inside the handle in the stored position.

U.S. Pat. No. 2,205,229 issued to E. L. Spriggs et al. on Nov. 1, 1938, relates to a collapsible fish landing net comprising a pair of normally relatively straight spring frame arms. Said spring frame arms are joined to one another at one end by means of a hinge member which is provided with a threaded end portion and a flattened hinge portion. Said threaded end portion is received by a threaded hole disposed within a handle. The other ends of said spring frame arms are provided with relatively rigid ears claspable in slidable relation to one another, the ear of one arm being provided with a slot, and the ear of the other arm with a stud adapted to pass through the slot, each of said ears being provided with a hook at its inner end about which a strand of a fish net is hookable, said hooks lying opposite their corresponding arms and having their open sides in close proximity to said arms into generally a ring shape wherein the flexure of the spring arms will tend to close the open space between said hooks and said arms, the free ends of each ear being adapted to slide inside the opposite arm when the arms are sprung into generally ring shape and to hold the arms in generally ring shape and to hold the arms in their sprung relationship until the net is collapsed.

There are numerous disadvantages to the prior art collapsible fishing net devices. In particular, it is desirable to provide for a structure which provides the strength and rigidity required to allow fish of relatively significant weight to be landed using a collapsible fishing net device. It is further desirable to provide for a collapsible fishing net device of this structure to be durable while also being easy and inexpensive to manufacture.

In addition, the prior art collapsible fishing net devices generally provide for a storage cavity within a handle within which the net is stored by wrapping same around the members which comprise the net frame. It is generally necessary to wrap the net because of the size of the components of such prior art collapsible fishing net devices generally do not leave ample room for the net to be stored in addition to the members making up the net frame.

In order to permit the net to be stored inside the handle and to avoid the net becoming tangled and torn when the components of the net frame and the net are being inserted in the handle, the net is wrapped around such components. Wrapping the net around such components is relatively time consuming and inconvenient. Also, the action of wrapping the net around these components, particularly if this is done tightly, causes additional stress on the strings comprising the net, which over time results in degradation of the net.

There is therefore a further need for a collapsible fishing net device which provides structure for storing the net within the handle of such device without the need for wrapping the net around the components of the device stored inside such handle along with the net.

DISCLOSURE OF INVENTION

In accordance with a first aspect of the invention, a collapsible fishing net device is provided comprising: (1) a handle having: a first end, second end, and fastening block disposed within said handle and adjacent to said first end; (2) collapsible net frame comprising: (a) a hinge means comprising a first hinge arm and second hinge arm; (b) first net frame arm and second net frame arm associated with said first and second hinge arms respectively wherein each of said first and second net frame arms presents a first end which is proximal to said hinge means and second end which is distal to said hinge means; (c) coupler adjacent to said distal end of said first and second net frame arms, said coupler being engageable to couple said first and second net frame arms; (d) fastener operably associated with said hinge means and fastening block to fasten said collapsible net frame to said handle assembly; and (e) net associated with said collapsible net frame; wherein: said fastening block receives said fastener and said first and second net frame arms are coupled by said coupling means to present a substantially circular net frame in a first operable position; and said coupler is disengaged and said first and second net frame arms are disposed substantially parallel in a second collapsed position.

In accordance with a further aspect of the invention, a collapsible fishing net device is provided comprising: (a) a handle having: (i) a first end and second end; (ii) a fastening block disposed within said handle body and adjacent to said first end; (iii) anchoring surface presented by said first end of said handle and fastening block; (b) a net presenting a fastening element; and (c) collapsible net frame associated with said net comprising: (i) a hinge means comprising a first hinge arm and second hinge arm; (ii) first net frame arm and second net frame arm associated with said first and second hinge arms respectively wherein each of said first and second net frame arms presents: (A) a first end which is proximal to said hinge means and second end which is distal to said hinge means; (B) anchor edge; (iii) coupler adjacent to said distal end of said first and second net frame arms, said coupler being engageable to couple said first and second net frame arms, wherein said coupler presents a receiving notch for holding said fastening element; and (iv) fastener operably associated with said hinge means and fastening block to fasten said collapsible net frame to said handle assembly; wherein: (1) said fastening block receives said fastener and said first and second net frame arms are coupled by said coupling means to present a substantially circular net frame in a first operable position; (2) each of said anchor edges bears against said anchor surface when said collapsible fishing net device is in said first operable position; (3) said coupler is disengaged and said first and second net frame arms are disposed substantially parallel in a second collapsed position; (4) said fastening element is presented substantially at the centre of said net when said net is in said first operable position; (5) when said receiving notch holds said fastening element said net is substantially distributed along said length of said net frame arms in said second collapsed position.

BRIEF DESCRIPTION OF DRAWINGS

A detailed description of the preferred embodiments are provided herein below, by way of example only, with reference to the following drawings, in which.

In the drawings, preferred embodiments of the invention are illustrated by way of example. It is expressly understood that the description and the drawings are only for the purpose of illustration and as an aid to understanding and are not intended as a definition of the limits of the invention.

BEST MODE FOR CARRYING OUT THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

Figures 1, 2:
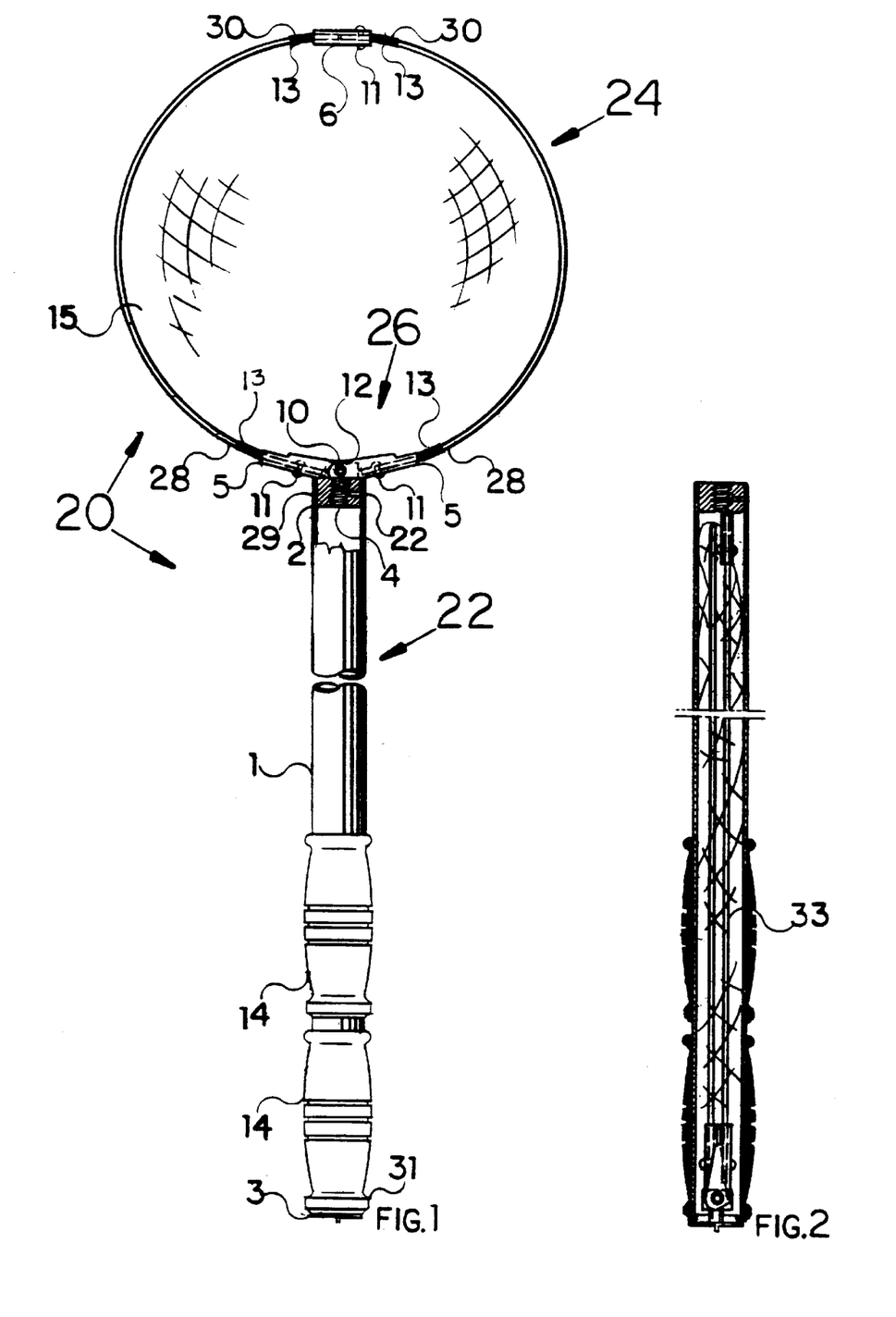
FIG. 1 is a top planar view of the first preferred embodiment of the invention in the operable position.
FIG. 2 is a cross-sectional view of the handle of the first preferred embodiment of the invention.

Now referring to FIG. 1, a first preferred embodiment of the collapsible fishing net device 20 is illustrated in a first operable position. Said collapsible fishing net device 20 comprises a handle 22 and collapsible net frame 24.

Figure 12:
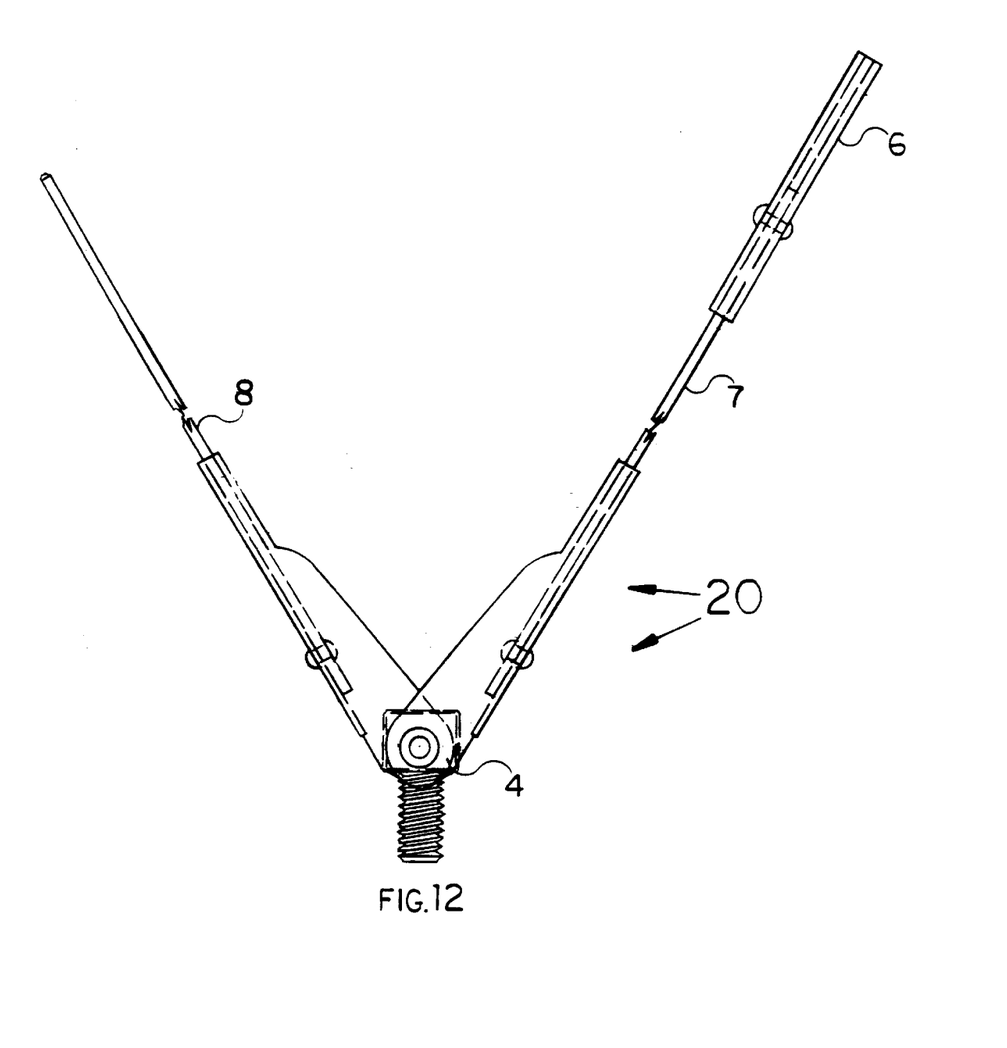
FIG. 12 is a partial view of the first preferred embodiment of the invention in which the collapsible net frame is mounted on the handle but the net frame arms are not coupled.

As best seen in FIG. 12, said collapsible net frame comprises a first net frame arm 7, second net frame arm 8 and hinge 26. Each of said first and second net frame arms 7, 8 present a first end 28 which is proximal to said hinge 26 and second end 30 which is distal to said hinge 26.

Figure 7:
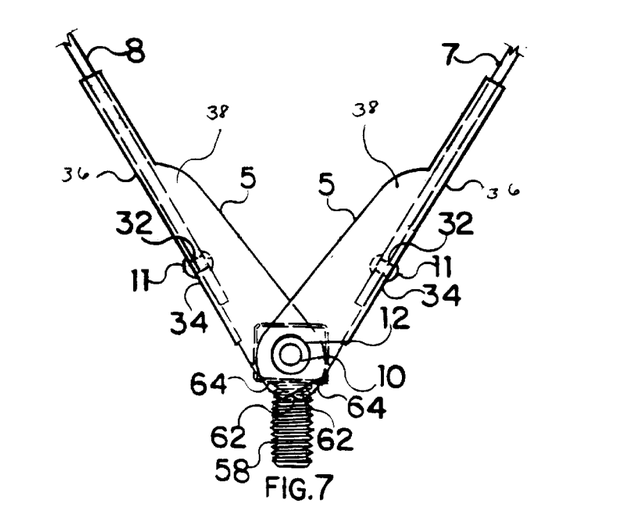
FIG. 7 is a top view of the hinge means presented by the collapsible net frame of the first preferred embodiment of the invention.
Figure 8:
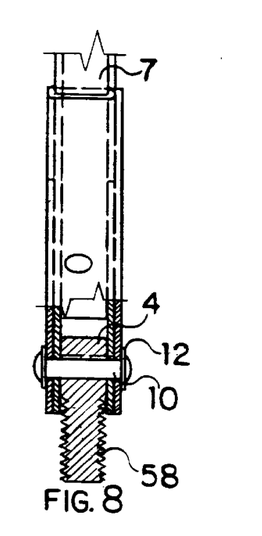
FIG. 8 is a cross-sectional view of the hinge means presented by the collapsible net frame of the first preferred embodiment of the invention.
Figure 13:
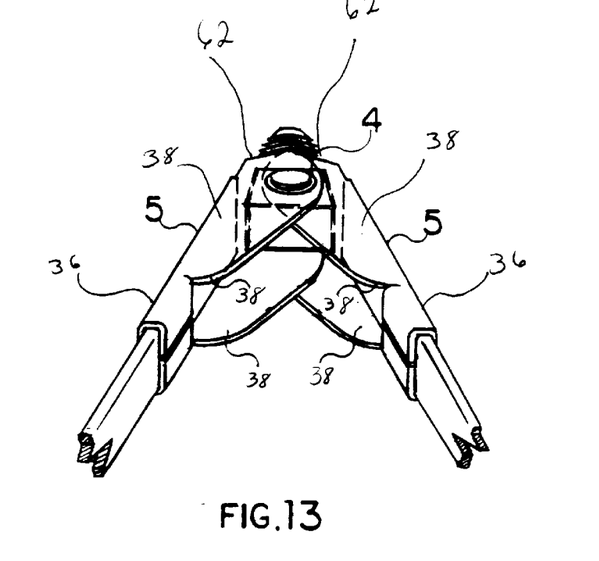
FIG. 13 is a perspective view of the hinge.

As best shown in FIG. 7, each of said first and second net frame arms 7, 8 comprise attachment holes 32. Said first and second net frame arms 7, 8 are associated with a pair 7 of shoulders 5. As best shown in FIG. 13, each of said shoulders 5 comprise a base 36 and side walls 38. Said base 36 of said shoulders 5 comprises shoulder holes 34.

Now referring again to FIG. 7, said first and second net frame arms 7, 8 are mounted on said shoulders 5 by means of rivets 11 which are inserted through said attachment holes 32 and shoulder holes 34 which communicate with said attachment holes 32. Alternative fastening means for securing said first and second net frame arms 7, 8 to said shoulders 5 might include nuts and bolts and the like.

It should be understood that while in the first preferred embodiment illustrated herein said first and second net frame arms 7, 8 and shoulders 5 constitute separate components, said first and second net frame arms 7, 8 can also be presented by a single component, moulded in steel (or some other material of adequate rigidity), for example, in a manner well-known to those skilled in the art.

Also as shown in FIGS. 1 and 7, said hinge 26 further comprises bar 4. Said bar 4 presents a fastening hole (not shown). Each of said side walls 38 further comprises a hinge hole (not shown) for receiving a rivet 10 and washer 12 thereby rotatably mounting each of said shoulders 5 on said bar 4. Accordingly, each of said first and second net frame arms 7, 8 is rotatable about the axis defined by the rivet 10.

Said collapsible fishing net device further comprises net 15. The strings of net 15 are looped around said first and second net frame arms 7, 8, in a manner that is well-known. It is desirable to further provide means to hold said net 15 in place and prevent said net 15 from sliding off of said first and second net frame arms 7, 8 and further to prevent said net 15 from bunching up at said hinge 26 when said collapsible net frame 24 is in said collapsed position, as shown in FIG. 2 (and partially collapsed in FIG. 12). Accordingly, said net 15 is attached to said first and second net frame arms 7, 8 by means of a plurality of net-locks 13, as shown in FIG. 1. In the preferred embodiments of the invention illustrated herein, four such net-locks 13 are used and such net-locks comprise standard heat-shrink tubing, applied in a manner well-known to those skilled in the art. An alternate number of said netlocks 13 can be used and said net-locks 13 may also comprise a metal clamp or the like.

Figure 6:
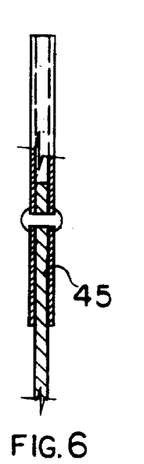
FIG. 6 is a partial cross-sectional view of the coupler presented by the collapsible net frame of the first preferred embodiment of the invention.

Said collapsible net frame 24 further comprises a coupler 6 to couple said first and second net frame arms 7, 8. Said coupler 6 comprises a lug which is attached to one of said first or second net frame arms 7, 8 by means of a rivet 11 and an attachment hole (not shown) disposed at said distal end 30 of said one of said first or second net frame arms 7, 8. Said attachment hole communicates with a corresponding hole presented by said coupler 6. Said lug receives a portion of the other of said first or second net frame arms 7, 8. In order to provide for an assembled collapsible net frame of desired rigidity, a lug of sufficient length is employed to provide a substantially rigid means of connecting said first and second net frame arms 7, 8 when in said operable position, as shown in FIG. 1. In addition, said coupler 6 further comprises a receiving section 45 (as shown in FIG. 6) wherein said other of said first and second net frame arms 7, 8 is received. The cross-section of said receiving section 45 is marginally smaller than the cross-section of said other of said first or second net frame arms 7, 8 whereby said other of said first or second net frame arms 7, 8 is frictionally received by said receiving section 45, as best shown in FIG. 6.

Said handle 22 (as shown in FIG. 1) presents a first end 29, second end 31 and a pair of hand grips 14 which are presented along the length of handle 22 adjacent to said second end 31, one hand grip for each of a user's hands. Two hand grips are desirable for landing a fish of relatively significant weight to maintain control of the collapsible fishing net device 20. It should be understood, however, that alternate means for gripping the collapsible fishing net device 20 can be provided without departing from the scope of the present invention. For example, said handle 22 may be furnished with a single gripping surface that is large enough to accommodate being gripped by a user with two hands.

As best shown in FIG. 2, in the first preferred embodiment of the invention illustrated herein said handle 22 comprises a tubular member having a storage cavity 33 for storing the collapsible net frame 24 when in said collapsed position.

Figure 9:
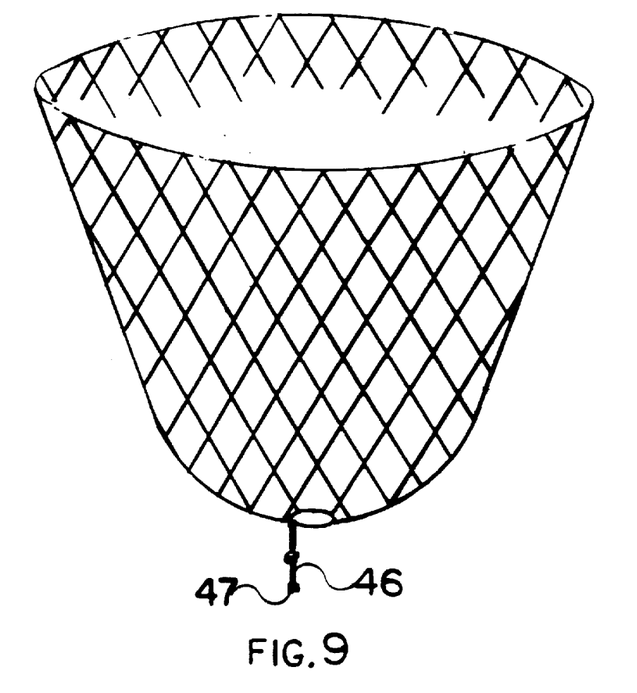
FIG. 9 is a view of the net presented by the second preferred embodiment of the invention, showing the fastening element.
Figures 10, 11:
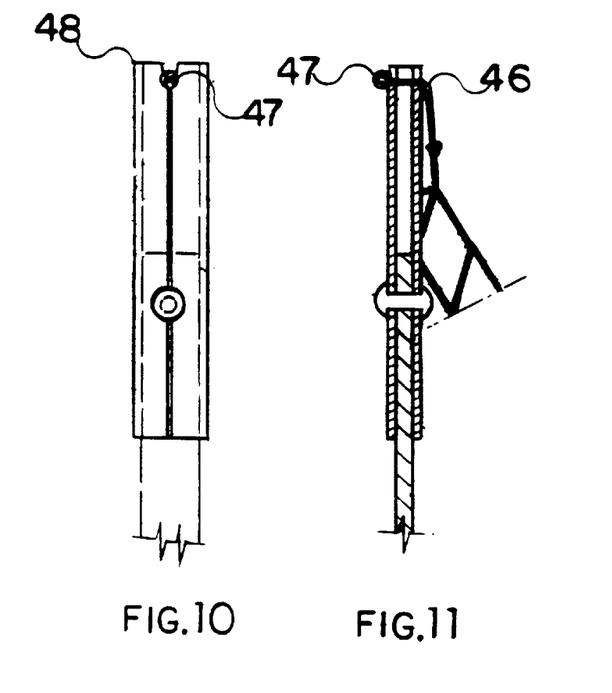
FIG. 10 is a partial top view of the coupler presented by the collapsible net frame of the second preferred embodiment of the invention, showing the receiving notch.
FIG. 11 is a cross-sectional view of the coupler presented by the collapsible net frame of the second preferred embodiment of the invention, showing the fastening element which is received by the receiving notch.

In a second preferred embodiment of the invention illustrated herein, said net 15, as best shown in FIG. 9, further presents a fastening element 46 such as a string having a blocking member at its extremity such as a knot 47 or plastic bar. In addition, in this second preferred embodiment of the invention, the end of said coupler 6 presents a receiving notch 48 for holding said fastening element 46 (as best shown in FIG. 10). When said collapsible net frame 24 is in said collapsed position, as best shown in FIG. 11, and the user of the collapsible fishing net device 20 wishes to store said net 15 inside said storage cavity 33, said fastening element 46 is placed within said receiving notch 48 so that said knot 47 is caught in said receiving notch 48. Consequently, said net 15 is substantially distributed along the length of said net frame arms 7, 8.

Figure 4:
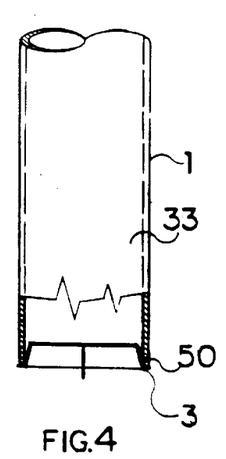
FIG. 4 is a partial cross-sectional view of the second end of the handle of the first preferred embodiment of the invention.
Figure 5:
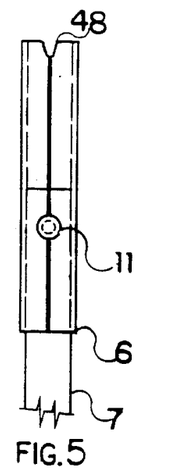
FIG. 5 is a partial top view of the coupler presented by the collapsible net frame of the first preferred embodiment of the invention.

In the first preferred embodiment of the invention described herein, said handle 22 further comprises a bottom opening 50, as best shown in FIG. 4, through which said collapsible net frame 24 is introduced into said storage cavity 33 when in said collapsed position. Said fastening element 46 and receiving notch 48 permit the net 15 to be stored inside the handle 22 without said net 15 becoming tangled and torn when said collapsible net frame 24 is being inserted into said storage cavity 33, without having to wrap said net 15 around said first and second net frame arms 7, 8.

The first preferred embodiment of the invention illustrated herein further provides for a cap 3 which is used to seal bottom opening 50 once said collapsible net frame 24 has been stored in said storage cavity 33, to prevent said collapsible net frame 24 from falling out of said storage cavity 33.

Figure 3:
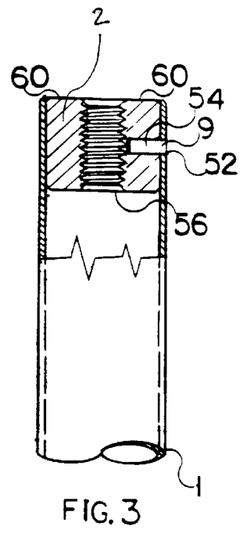
FIG. 3 is a partial cross-sectional view of the first end of the handle of the first preferred embodiment of the invention.

Said handle 22 further presents a fastening block 2 disposed within said handle 22 adjacent to said first end 29 (as shown in FIG. 3). In the first preferred embodiment of the invention illustrated herein said fastening block 2 comprises a holder plate having a cross-section which is marginally greater than the inner cross-section of said handle 22 at said first end 29. Said fastening block 2 is friction fitted inside said handle 22 adjacent to said first end 29. To further rigidity said fastening block 2, the outer wall of said handle 22 is provided with a blocking hole 52. In the first preferred embodiment of the invention illustrated herein, said fastening block 2 presents a pin hole 54. A pin 9 is inserted through blocking hole 52 into pin hole 54 in order to further hold fastening block 2 in place and prevent rotation or lateral displacement thereof within said handle 22.

Said fastening block 2 further comprises a receiving member 56 for receiving said collapsible net frame 24. In the first preferred embodiment of the invention illustrated herein, said receiving member 56 comprises a receiving hole which is threaded. Said bar 4 comprises a threaded screw member 58 (as shown in FIG. 7) which is received by said receiving hole. Alternate means can be provided for permitting a secured connection of said collapsible net frame 24 to said handle 22. For example said bar 4 might present a threaded hole, and said fastening block might present a screw. Or alternatively, said screw member 58 of said bar 4 might present a securing aperture which corresponds to similar securing apertures disposed, for example, on two sides of said handle 22 through which a securing bar might be inserted to further rigidify the mechanical connection between said handle 22 and said collapsible net frame 24.

Figure 14:
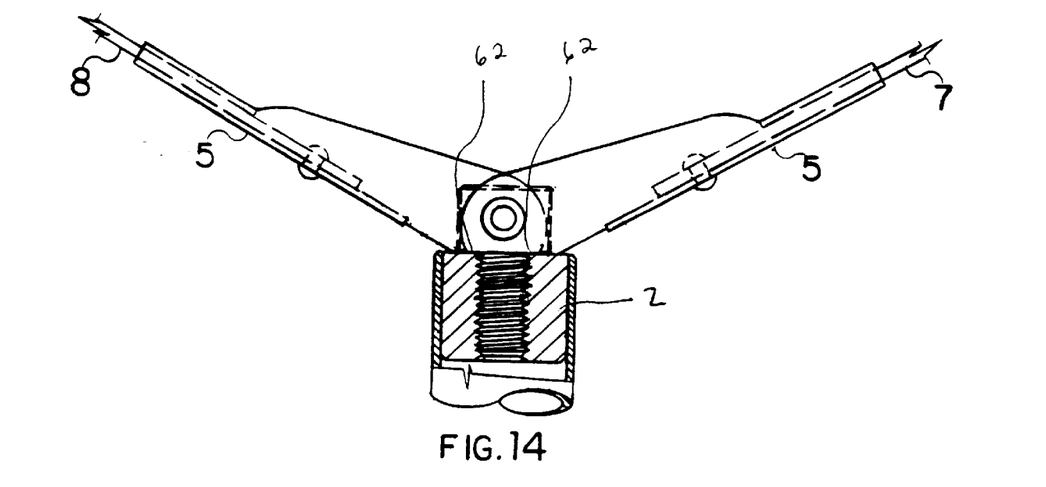
FIG. 14 illustrates the optimal angle between the anchoring edges and the outer side portion of each of said first and second net frame members.

As best shown in FIG. 3, said fastening block 2 presents an anchor surface 60. Also, in the first preferred embodiment of the invention illustrated herein, as best shown in FIGS. 1 and 7, each of said shoulders 5 further presents a pair of anchoring edges 62. In operation, said screw member 58 of bar 4 is threaded into said threaded receiving hole 56. In doing so, said anchoring edges 62 are flattened vis-a-vis said anchor surface 60 so as to bear against said anchor surface 60, as best shown in FIG. 14.

In order to achieve optimal rigidity of said collapsible net frame 24, it is desirable for said anchoring edges 62 to contact said anchor surface 60 on a straight edge, as best shown in FIG. 1, to achieve said operable position shown in FIG. 1.

In addition, as best shown in FIG. 7, in the first preferred embodiment of the invention illustrated herein, said bar 4 presents a bottom surface 64. In the structure disclosed herein, said bar 4 and shoulders 5 are hingedly associated so that said bottom surface 64 is spaced apart from said anchoring edges 62 of said shoulders 5 so that said bottom surface 64 does not contact said anchor surface 60 when said collapsible net frame 24 is attached to said handle 22, as described above and shown in FIG. 14. In other words, the bottom surface 64 is spaced above the anchor surface 60 when the anchor edges 62 bear against the anchor surface 60. It is desirable for said bottom surface 60 to be so spaced apart from the perspective of providing structure for a rigid collapsible net frame 24, as explained below.

Prior art collapsible fishing net devices have provided collapsible net frame structures wherein components corresponding to said bottom surface 64 of said bar 4 and anchoring edges 62 contact said anchor surface 60 in one plane. Such a structure is disadvantageous because during use of a collapsible fishing net device in the outdoors it is quite common for extraneous material such as dirt or lime to build up on said anchor surface 60. This extraneous material impedes connection of said collapsible net frame 24 to said handle 22 by preventing said bottom surface 64 from bearing against said anchor surface 60, whereby said anchoring edges 62 also cannot bear against said anchor surface 60 on a straight edge. Consequently, the rigidity of said collapsible net frame is impaired when in said operable position. Accordingly, in use of such prior art collapsible fishing net devices it is often necessary to regularly clean said anchor surface 60 during use in order to obtain a net frame structure of sufficient rigidity.

In addition, through repeated use of prior art collapsible fishing net devices said anchoring edges 62, or mechanical equivalents thereof, are worn down over time because of frictional contact with said anchor surface 60. This is because in the prior art structures described above said bottom surface 64 of said bar 4 may over time extend beyond said anchoring edges 62 toward said handle 22 where said anchoring edges 62 wear at a faster rate than said bottom surface 64. If such bottom surface 64 so extends beyond said anchoring edges 62, again the rigidity of the collapsible net frame 24 will be negatively affected because when said collapsible net frame 24 is attached to said handle 22, said anchoring edges 62 will not bear against said anchor surface 60 on a straight edge.

In contrast, when said bottom surface 64 is spaced apart from said anchoring edges 62, so that said anchoring edges 62 extend beyond said bottom surface 64 in the direction of said handle 22 when the collapsible fishing net device is assembled, said anchoring edges 62 when bearing against said anchor surface 60 on a straight edge provide sufficient rigidity without said bottom surface 64 also bearing on said anchor surface 60. However, in operation of the collapsible fishing net device illustrated herein, it is not necessary to screw said screw member 58 of said bar 4 fully into said receiving hole 56 in order to rigidify said first and second net frame arms 7, 8. Any extraneous material present on said anchor surface 60 therefore will not impede rigidification of said collapsible net frame 24 so long as such extraneous material does not prevent said screw member 58 to be screwed into said receiving hole 56.

In operation, as best shown in FIGS. 1 and 12 said collapsible net frame 24 is secured to said handle 22, as described above, whereby said first and second net frame arms 7, 8 extend outward to form a v-shaped frame and then are coupled using said coupling means 6. It has been found that from the perspective of rigidity, it is desirable that means be provided to assemble said collapsible net frame 24 to achieve a circular cross-section of said collapsible net frame 24 in said operable position. In the preferred embodiment of the invention illustrated herein, such means are presented by providing for an optimal angle between said anchoring edges 62 and the outer side portion 66 of each of said first and second net frame members 7, 8, as best shown in FIG. 14. The optimal angle depends on the combined length of said first and second net frame members 7, 8 which determines the circumference and thereby the diameter of set collapsible net frame 24. For example, where the diameter of said collapsible net frame 24 in said operable position is 20", said optimal angle is approximately 15 degrees, as shown in FIG. 14. Alternate optimal angles substantially conforming to the curvature of said collapsible net frame 24 having alternate diameters may also be provided, in a manner that is well-known.

It is also desirable to provide means for aerating said storage cavity 33 so that said net 15 and collapsible net frame 24 may dry to avoid corrosion of said collapsible net frame 24 and/or degradation of said net 15. In the preferred embodiment of the invention illustrated herein said receiving hole 56 communicates with said storage cavity 33 and is left uncovered when said collapsible net frame 24 is stored in said storage cavity 33. The size of said receiving hole 56 does not permit said disassembled collapsible net frame 24 to exit therethrough but provides aeration of said storage cavity 33. Additional aeration means might include further aeration holes along the length of said handle 22 which communicate with said storage cavity 33.

The various rigid elements of said collapsible fishing net device 20 such as said handle 22, fastening block 2 and shoulders 5 etc. may comprise any material of sufficient rigidity such as steel, brass or a rigid plastic. Said net frame arms 7, 8 may comprise any material which is flexible yet sufficiently rigid, such as flexible steel or a flexible yet rigid plastic.

Various embodiments of the invention have now been described in detail. Since changes in and/or additions to the above-described best mode may be made without departing from the nature, spirit or scope of the invention, the invention is not to be limited to said details.

What is claimed is:

1. A collapsible fishing net device comprising:
   (a) a handle having:
      (i) a first end and second end; and
      (ii) fastening block disposed within said handle and adjacent to said first end;
   (b) collapsible net frame comprising;
      (i) a hinge means comprising a first hinge arm and second hinge arm;

(ii) first net frame arm and second net frame arm associated with said first and second hinge arms respectively wherein each of said first and second net frame arms presents a first end which is proximal to said hinge means, second end which is distal to said hinge means, and length;
(iii) coupler adjacent to said distal end of said first and second net frame arms, said coupler being engageable to couple said first and second net frame arms;
(iv) fastener operably associated with said hinge means and fastening block to fasten said collapsible net frame to said handle assembly; and
(v) receiving element: and
(c) net associated with said collapsible net frame, said net presenting a fastening element
wherein:
(i) said fastening block receives said fastener and said first and second net frame arms are coupled by said coupling means to present a substantially circular net frame In a first operable position;
(ii) said coupler is disengaged and said first and second net frame arms are disposed substantially parallel in a second collapsed position; and
(iii) said receiving element is presented by said collapsible net frame distal to said fastening element and is adapted to receive said fastening element, whereby said net is substantially distributed along said length when said fastening element is received by said receiving element in said second collapsed position.

2. A collapsible fishing net device as claimed in claim 1 wherein
(a) said handle further comprises an anchoring surface presented by said first end of said handle and fastening block; and
(b) each of said first and second hinge arms presents an anchor edge;
wherein each of said anchor edges bears against said anchoring surface when said collapsible fishing net device is in said first operable position.

3. A collapsible fishing net device as claimed in claim 2, wherein said fastener includes a shoulder spaced apart from said anchoring surface when in said first operable position.

4. A collapsible fishing net device as claimed in claims 3, wherein said handle further comprises a storage cavity and opening adjacent to said second end of said handle, wherein said net frame is inserted through said opening into said storage cavity for storing said collapsible net frame when said collapsible fishing net device is in said second collapsed position.

5. A collapsible fishing net device as claimed in claim 4, wherein said fastening block further comprises a receiving member, wherein said receiving member presents a receiving hole which receives said fastener and resists removal of said fastener once said fastener has been received.

6. A collapsible fishing net device as claimed in claim 5, wherein said receiving hole is threaded and said fastener comprises a threaded member which is threadably received by said receiving hole.

7. A collapsible fishing net device as claimed in claim 6, wherein said coupler comprises a lug which is attached to said distal end of one of said first-or second net frame arms.

8. A collapsible fishing net device as claimed in claim 7, wherein:
(a) said fastening element is presented substantially at the centre of said net, when said net is in said operable position; and
(b) said receiving element is presented by said coupler.

9. A collapsible fishing net device as claimed in claim 8, wherein said receiving hole communicates with said storage cavity.

10. A collapsible fishing net device as claimed in claim 9, wherein said collapsible fishing net device further comprises a cap which is received by said opening to prevent said collapsible net frame from falling out from said storage cavity wherein said cap is removed from said opening to remove said collapsible net frame from said cavity when a user wishes to assemble said collapsible fishing net device.

11. A collapsible fishing net device as claimed in claim 9, wherein the diameter of said receiving hole does not permit said collapsible net frame to exit said storage cavity therethrough.

12. A collapsible fishing net device as claimed in claim 11, wherein:
(a) said handle further comprises a tubular member having an inner cross-section; and
(b) said receiving member has a cross-section which is marginally greater than said inner cross-section of said tubular member whereby said receiving member is frictionally fitted within said tubular member adjacent to said first end.

13. A collapsible fishing net device as claimed in claim 12, wherein:
(a) said receiving member comprises an outer surface and said outer surface of said receiving member presents an attachment hole;
(b) said tubular member further comprises an outer surface and said outer surface of said tubular member presents a pin hole, wherein said attachment hole and pin hole communicate; and
(c) said collapsible fishing net device further comprises an attachment pin which is inserted through said pin hole into said attachment hole to prevent rotation of said receiving member within said tubular member.

14. A collapsible fishing net device, as claimed in claim 8, wherein said receiving element comprises a notch.

15. A collapsible fishing net device comprising:
(a) a handle having:
(i) a first end and second end;
(ii) fastening block disposed within said handle body and adjacent to said first end; and
(iii) anchoring surface presented by said first end of said handle and fastening block;
(b) net, said net presenting a fastening element
(c) collapsible net frame associated with said net comprising:
(i) a hinge means comprising a first hinge arm and second hinge arm;
(ii) first net frame arm and second net frame arm associated with said first and second hinge arms respectively wherein each of said first and second net frame arms presents:
(A) a first end which is proximal to said hinge means and second end which is distal to said hinge means;
(B) anchor edge; and
(C) substantially even length;
(iii) coupler adjacent to said distal end of said first and second net frame arms, said coupler being engageable to couple said first and second frame arms, wherein said coupler presents a receiving notch for holding said fastening element;
(iv) fastener operably associated with said hinge means and fastening block to fasten said collapsible net frame to said handle assembly; and wherein:
   (i) said fastening block receives said fastener and said first and second net frame arms are coupled by said coupling means to present a substantially circular net frame in a first operable position;
   (ii) each of said anchor edges bears against said anchor surface when said collapsible fishing net device is in said first operable position;
   (iii) said coupler is disengaged and said first and second net frame arms are disposed substantially parallel in a second collapsed position;
   (iv) said fastening element is presented substantially at the centre of said net when said net is in said first operable position;
   (v) when said receiving notch holds said fastening element said net is substantially distributed along said length of said net frame arms in said second collapsed position.

16. A collapsible fishing net device comprising:
(a) a handle having:
   (ii) a first end and second end; and
   (ii) fastening block disposed within said handle and adjacent to said first end;
(b) collapsible net frame comprising:
   (i) first net frame arm and second net frame arm releasably securable to said fastening block wherein each of said first and second net frame arms presents a first end which is proximal to said fastening block and second end which is distal to said fastening block, and length;
   (ii) coupler adjacent to said distal end of said first and second net frame arms, said coupler being engageable to couple said first and second net frame arms; and
   (iii) receiving element; and
(c) net associated with said collapsible net frame, said net presenting a fastening element wherein:
   (i) said fastening block receives said fastener and said first and second net frame arms are coupled by said coupling means to present a substantially circular net frame in a first operable position;
   (ii) said coupler is disengaged and said first and second net frame arms are disposed substantially parallel in a second collapsed position; and
   (iii) said receiving element is presented by said collapsible net frame distal to said fastening element and is adapted to receive said fastening element, whereby said net is substantially distributed along said length when said fastening element is received by said receiving element in said second collapsed position.

\* \* \* \* \*